US 6,536,297 B2

(12) United States Patent
Yamamoto

(10) Patent No.: US 6,536,297 B2
(45) Date of Patent: Mar. 25, 2003

(54) SHIFT-ASSISTING DEVICE FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/888,643

(22) Filed: Jun. 26, 2001

(65) Prior Publication Data
US 2002/0000133 A1 Jan. 3, 2002

(30) Foreign Application Priority Data
Jun. 29, 2000 (JP) ........................................ 2000-196958

(51) Int. Cl.[7] ................................................ F16H 59/00
(52) U.S. Cl. ........................................ 74/335; 74/473.12
(58) Field of Search ........................... 74/335, 473.12; 701/52, 55

(56) References Cited

U.S. PATENT DOCUMENTS 4,911,031 A * 3/1990 Yoshimura et al. ......... 477/123
5,832,777 A * 11/1998 Weilant ....................... 74/335
5,979,258 A * 11/1999 Nakano ....................... 74/335
6,209,408 B1 * 4/2001 DeJonge et al. ............ 74/335
6,333,615 B1 * 12/2001 Maezawa et al. ........... 318/595
6,361,473 B1 * 3/2002 Mason et al. ............... 477/124

* cited by examiner

Primary Examiner—Charles A Marmor
Assistant Examiner—Dennis Abdelnour
(74) Attorney, Agent, or Firm—Antonelli, Terry, Stout & Kraus, LLP

(57) ABSTRACT

A shift-assisting device for a transmission, equipped with an electric motor for operating a shifting mechanism in the same direction as the direction of shifting operation of a speed-change lever. The shifting mechanism is coupled to the speed-change lever to actuate the synchronizing mechanism of the transmission. The electric power for driving the electric motor is determined depending on a shift stroke position detected by a shift stroke sensor and on a shifting force detected by a shifting force sensor.

2 Claims, 6 Drawing Sheets

SHIFT-ASSISTING DEVICE FOR A TRANSMISSION

FIELD OF THE INVENTION

The present invention relates to a shift-assisting device which enables the shifting operation to be executed with a decreased force in changing the speed of a transmission mounted on a vehicle.

DESCRIPTION OF THE PRIOR ART

Large trucks and buses that require a large shifting force for changing the speed have been equipped with a shift-assisting device for executing the shifting operation with a decreased force. The shift-assisting device with which large vehicles are furnished, generally, uses a compressed air as a source of operation. The shift-assisting device that uses the compressed air as the source of operation is equipped with a shift actuator comprising a pneumatic pressure cylinder that operates the speed-change operation mechanism coupled to a speed-change lever in the direction same as the direction in which the speed-change lever is shifted. Large vehicles generally use the compressed air as a source for operating the brake and are, hence, allowed to use the compressed air for the shift-assisting device. However, small- and medium-sized vehicles that are not equipped with a compressor as a source of the compressed air, cannot be provided with the shift-assisting device that uses a shift actuator which comprises a pneumatic pressure cylinder. In recent years, however, it has been demanded to provide even small- and medium-sized vehicles with the shift-assisting device, and there have been proposed shift-assisting devices using an electric motor as taught in, for example, Japanese Laid-open Patent Publication (Kokai) No. 87237/1993 (JP-A 5-87237) and Japanese Patent No. 2987121. In the shift-assisting device using the electric motor, it is desired that the driving force of the electric motor is controlled depending upon the manner of operating the speed-change lever by a driver so that a smooth shifting operation can be conducted. According to the shift-assisting devices disclosed in the above Japanese Laid-open Patent Publication (Kokai) No. 87237/1993 and Japanese Patent No. 2987121, a force for an operation of the speed-change lever toward the direction of shift is detected and the driving force of the electric motor is controlled according to this force of operation. Further, Japanese Patent No. 2987121 discloses a technology in which the speed of a shifting operation is detected and an increasing rate of the driving force of the electric motor is increased with an increase in the speed of the shifting operation.

In shifting the transmission equipped with a synchronizing mechanism, the largest operation force is required for bringing the gears into engagement in a synchronizing operation in the gear-engaging operation, and then, a second largest force is required for engaging the chamfer of dog teeth with the chamfer of spline of the clutch sleeve. And, in an gear-disengaging operation, an operation force is required during from the start of the gear-disengaging operation until when the dog teeth are disengaged from the spline of the clutch sleeve. In the shift-assisting device for controlling the driving force of the electric motor according to the operation force, however, the electric motor is driven after the operation force has reached a predetermined value and hence, there exists a time lag until the assisting force is produced after the operation force has increased. In shifting the transmission, therefore, the driver feels a large force just before the assisting force is produced by the electric motor. In order to solve this problem, the present applicant has proposed in Japanese Patent Application No. 46173/2000 a shift-assisting device for a transmission, equipped with a shift stroke sensor that detects the shift stroke position of the shifting mechanism and controls the electric motor for assisting the shifting operation correspondingly to the shift stroke position based on a detection signal from the shift stroke sensor.

In the shift-assisting device for a transmission in which the shift-assisting electric motor is controlled in response to the shift stroke position, the shift-assisting force corresponding to the shift stroke position can be obtained thereby to prevent the occurrence of time lag from the shifting operation. Even when an operation force is small, however, a predetermined assisting force is produced at a predetermined shift stroke position and consequently, it often happens that the assisting force does not match with the driver's operation feeling.

SUMMARY OF THE INVENTION

It is an object of the present invention to provide a shift-assisting device for a transmission, which is capable of producing an assisting force close to the driver's operation feeling that meets the shift stroke position and the shifting force.

In order to accomplish the above-mentioned object, the present invention provides a shift-assisting device for a transmission, equipped with an electric motor for operating a shifting mechanism in a direction same as the direction of shifting operation of a speed-change lever, the shifting mechanism being coupled to the speed-change lever to actuate the synchronizing mechanism of the transmission, wherein the shift-assisting device for a transmission comprises:

a shift stroke sensor for detecting a shift stroke position of the shifting mechanism;

a shifting force sensor for detecting a shifting force of the speed-change lever; and a controller for controlling the electric power for driving the electric motor based on the signals from the shift stroke sensor and said shifting force sensor;

the controller determining the driving electric power depending on the shift stroke position detected by the shift stroke sensor and on the shifting force detected by the shifting force sensor.

The electric power for driving the electric motor is obtained by multiplying a multiplying factor set correspondingly to the shift stroke position, a shifting force and a predetermined constant.

DETAILED DESCRIPTION OF THE PREFERRED EMBODIMENTS

A preferred embodiment of the shift-assisting device for a transmission constituted according to the present invention will now be described in further detail with reference to the accompanying drawings.

Figure 1:
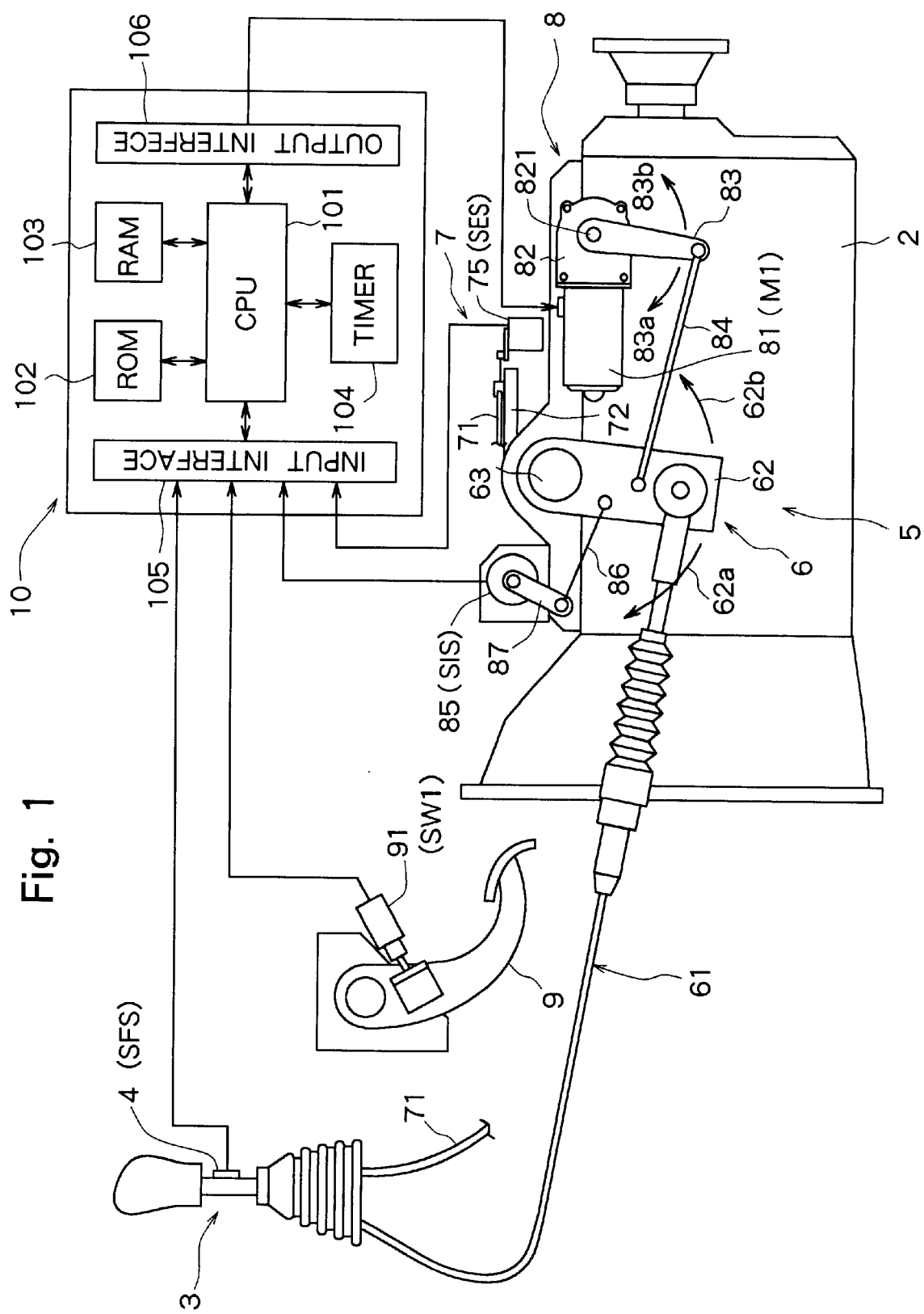
FIG. 1 is a diagram schematically illustrating the constitution of a speed-changing mechanism equipped with a shift-assisting device in a transmission constituted according to the present invention.

FIG. 1 is a diagram schematically illustrating the constitution of a speed-changing mechanism equipped with a shift-assisting device for a transmission, constituted according to the present invention.

The speed-changing mechanism shown in FIG. 1 comprises a speed-change lever 3 for changing the speed of a transmission 2 equipped with a synchronizing mechanism, a speed-change operation mechanism 5 coupled to the speed-change lever 3, and a shift-assisting device 8 for operating the speed-change operation mechanism 5 in the direction same as the direction in which the speed-change lever 3 is shifted.

Figure 2:
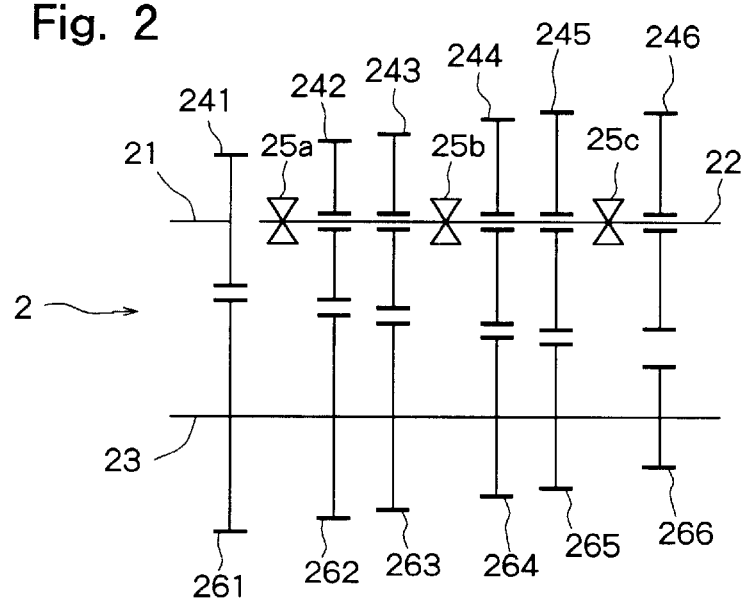
FIG. 2 is a diagram schematically illustrating the constitution of a gear mechanism in the transmission of FIG. 1.

Referring to FIG. 2, the transmission 2 comprises a gear mechanism of five forward speeds and one reverse speed. The transmission 2 has an input shaft 21, an output shaft 22 disposed on the same axis as that of the input shaft 21, and a counter shaft 23 arranged in parallel with the output shaft 22. On the input shaft 21 is mounted a drive gear 241 (a fifth speed gear in the illustrated embodiment), and on the output shaft 22 are rotatably mounted a fourth speed gear 242, a third speed gear 243, a second speed gear 244, a first speed gear 245 and a reverse gear 246. On the output shaft 22 are further disposed synchronizing mechanisms 25a, 25b and 25c between the fifth speed gear 241 and the fourth speed gear 242, between the third speed gear 243 and the second speed gear 244, and between the first speed gear 245 and the reverse gear 246, respectively. On the counter shaft 23, there are arranged counter gears 261, 262, 263, 264 and 265 that are in mesh with the fifth speed gear 241, fourth speed gear 242, third speed gear 243, second speed gear 244 and first speed gear 245 at all times, as well as a counter gear 266 that is in mesh with the reverse gear 246 via an idling gear that is not shown.

Figure 3:
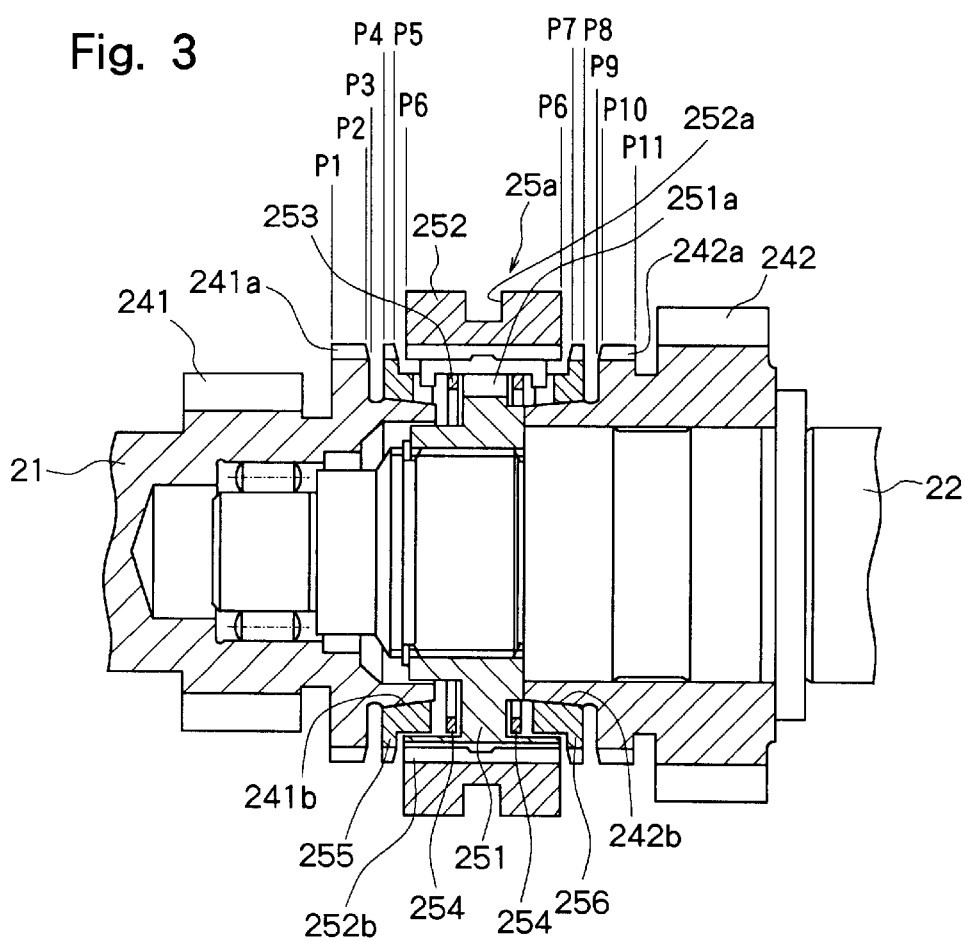
FIG. 3 is a sectional view of a synchronizing mechanism with which the transmission of FIG. 2 is provided.

Next, the synchronizing mechanisms 25a, 25b and 25c will be described with reference to FIG. 3. The illustrated synchronizing mechanisms 25a, 25b and 25c are all constituted substantially in the same manner. Therefore, described below is the synchronizing mechanism 25a only that is disposed between the fifth speed gear 241 and the fourth speed gear 242.

The illustrated synchronizing mechanism 25a is a known key-type synchronizing mechanism which comprises a clutch hub 251 mounted on the output shaft 22, a clutch sleeve 252 slidably fitted to an external gear spline formed on the outer circumference of the clutch hub 251, keys 253 arranged in plural (e.g., three) key grooves 251a formed in the clutch hub 251 in the radial direction thereof, key springs 254, 254 arranged on the inner sides at both ends of the keys 253 to push the keys 253 toward the clutch sleeve 252, dog teeth 241a and 242a formed on the fifth speed gear 241 and on the fourth speed gear 242, and synchronizer rings 255 and 256 disposed on the conical surfaces 241b and 242b formed on the fifth speed gear 241 and on the fourth speed gear 242. The thus constituted synchronizing mechanism 25a has a shift fork fitted into an annular groove 252a formed in the outer circumference of the clutch sleeve 252, the shift fork being mounted on a shift rod of a shifting mechanism that constitutes the speed-change operation mechanism 5 as will be described later. The clutch sleeve 252 is slid by the shift fork toward either the right or the left in the drawing, whereby the spline 252b of the clutch sleeve 252 is brought into mesh with the teeth of the synchronizer ring 255 and dog teeth 241a or with the synchronizer ring 256 and dog teeth 242a. The illustrated synchronizing mechanism has been constituted in a known manner and hence, is not described here in further detail.

The above-mentioned synchronizing mechanisms 25a, 25b and 25c are operated by the speed-change lever 3 and by the speed-change operation mechanism 5 connected to the speed-change lever 3. The speed-change lever 3 is so constituted as can be tilted in a direction (direction of selection) perpendicular to the surface of the paper in FIG. 1 and in the right-and-left direction (direction of shift) with a shaft as a center, that is not shown. In order to operate the synchronizing mechanisms 25a, 25b and 25c, the speed-change lever 3 is operated along a speed-change pattern shown in FIG. 4. A shifting force sensor 4 (SFS) is disposed in the speed-change lever 3 to detect the shifting force of the speed-change lever. The shifting force sensor 4 (SFS) consists of a distortion sensor and is mounted on the side surface of the speed-change lever 3 on the right side in FIG. 2. When the speed-change lever 3 is shifted toward the left in FIG. 2, a tensile load is exerted on the shifting force sensor 4 (SFS) which is a distortion sensor mounted on the right side surface of the speed-change lever 3 in FIG. 2. When the speed-change lever 3 is shifted toward the right in FIG. 2, a compressive load is exerted on the shifting force sensor 4 (SFS). Upon shifting the speed-change lever 3 toward the right or left, therefore, the shifting force sensor 4 (SFS) produces voltage signals (Vf) of characteristics as shown in FIG. 5. That is, the shifting force sensor 4 (SFS) in the illustrated embodiment produces a voltage signal of, for example, 2.5 V when the distortion is zero (0) in a state where no shifting force is applied to the speed-change lever 3. When the speed-change lever 3 is shifted toward the left in FIG. 1 and a tensile load is exerted, the shifting force sensor 4 (SFS) produces a voltage signal lower than 2.5 V. When the speed-change lever 3 is shifted toward the right in FIG. 1 and a compressive load is exerted, the shifting force sensor 4 (SFS) produces a voltage signal higher than 2.5 V. Accordingly, the direction of shift can be judged depending upon whether the output voltage (Vf) of the shifting force sensor 4 (SFS) is lower than, or higher than, 2.5 V. The thus constituted shifting force sensor 4 (SFS) sends a detection signal to a controller 10.

Figure 6:
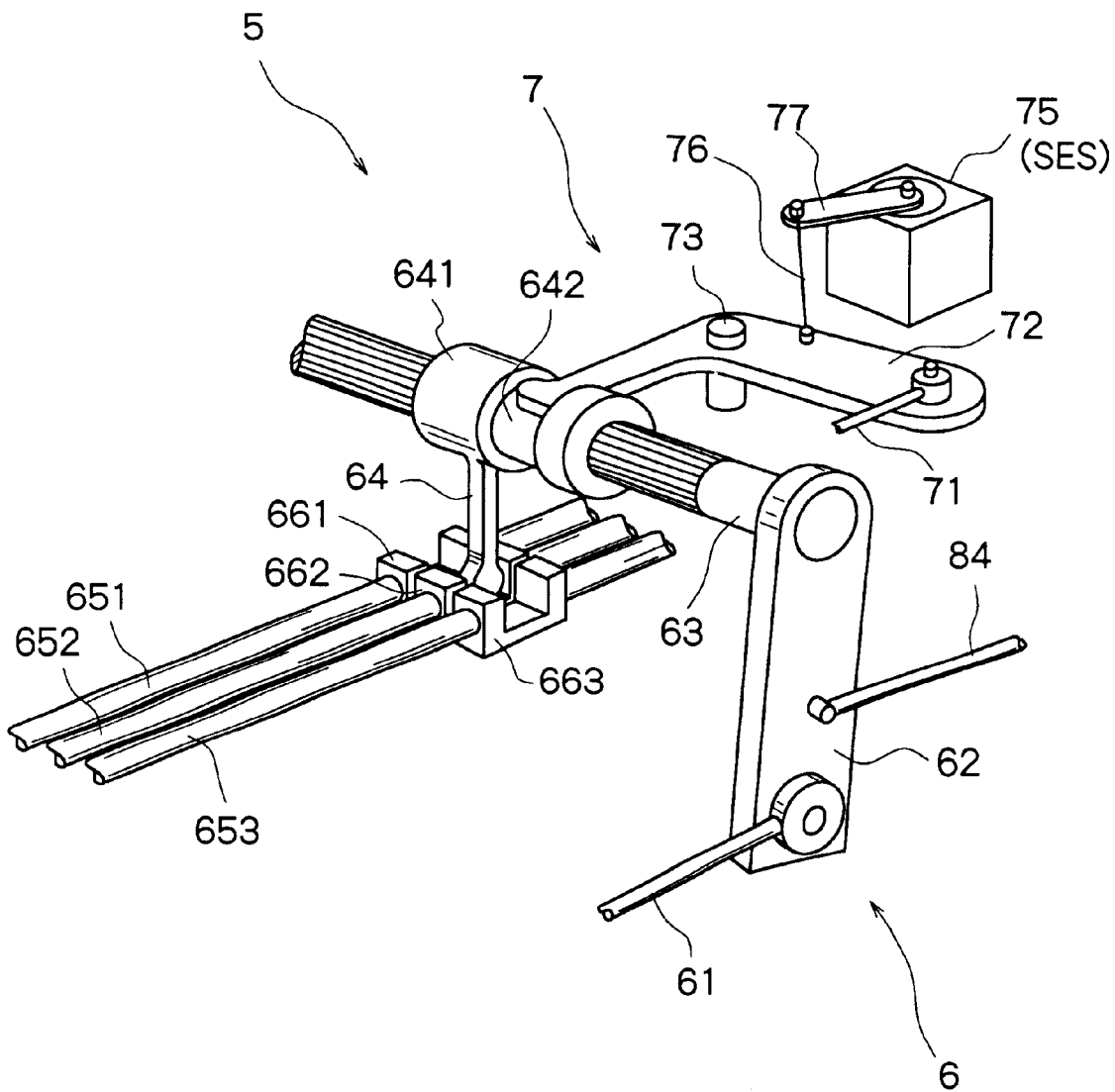
FIG. 6 is a perspective view illustrating major portions of a shifting mechanism constituting the speed-changing mechanism shown in FIG. 1.

Next, described below with reference to FIGS. 1 and 6 is the speed-change operation mechanism 5 that is coupled to the speed-change lever 3 for operating the above-mentioned synchronizing mechanisms 25a, 25b and 25c.

The speed-change operation mechanism 5 is constituted by a shifting mechanism 6 and a selector mechanism 7. The shifting mechanism 6 includes a push-pull cable 61 which is connected at its one end to the speed-change lever 3, a control lever 62 which is connected at its one end to the other end of the push-pull cable 61, a control rod 63 which is connected to the other end of the control lever 62 and is rotatably supported by a case cover (not shown) of the transmission 2, and a shift lever 64 fitted by spline to the control rod 63 so as to slide in the axial direction. The shift lever 64 selectively engages at its end with a shift block 661, 662 or 663 mounted on the shift rods 651, 652 and 653. Shift forks (not shown) are mounted on the shift rods 651, 652 and 653, and engage with the annular grooves formed in the outer circumferences of the clutch sleeves of the synchronizing mechanisms 25a, 25b and 25c. Known interlocking mechanisms are arranged among the shift rods 651, 652 and 653, so that two shift rods will not operate simultaneously. The shifting mechanism 6 is constituted in a known manner and hence, is not described here in further detail.

The shift lever 64 is slid in the axial direction by the selector mechanism 7 and is brought to a predetermined selected position. The selector mechanism 7 includes a push-pull cable 71 coupled, at its one end, to the speed-change lever 3, and a selecting lever 72 coupled, at its one end, to the other end of the push-pull cable 71 and is supported at its intermediate portion so as to rotate on a support shaft 73 as a center. The other end of the selecting lever 72 is brought into engagement with a fitting groove 642 formed in the outer peripheral surface of a mounting boss portion 641 of the shift lever 64. By moving the speed-change lever 3 in the direction of selection, therefore, the shift lever 64 is slid on the control rod 63 in the axial direction via the push-pull cable 71 and the selecting lever 72. The other end of the shift lever 64 is brought into selective engagement with the shift block 661, 662 or 663. The selecting mechanism 7 has a known constitution and hence, is not described here in further detail.

The selecting mechanism 7 in the illustrated embodiment is equipped with a selected position sensor 75 (SES) for detecting the position of the shift lever 64 in the direction of selection. The selected position sensor 75 (SES) is coupled to the selecting lever 72 via a rod 76 and a lever 77 and is constituted by a potentiometer that detects the position of the shift lever 64 in the direction of selection according to the angle of operation of the selecting lever 72. A detection signal thereof is sent to the controller 10.

In the illustrated embodiment, there is provided with the shift-assisting device 8 for operating the above-mentioned shifting mechanism 6 in the same direction as the direction in which the speed-change lever 3 is shifted. The shift-assisting device 8 is equipped with an electric motor 81 (M1) that can be rotatively driven forward and reverse as a source of driving force. A reduction gear 82 is coupled to the electric motor 81 (M1), and an end of an operation lever 83 is mounted on an output shaft 821 of the reduction gear 82. The other end of the operation lever 83 is coupled to the control lever 62 via a coupling rod 84. When the electric motor 81 (M1) is driven forward, the thus constituted shift-assisting device 8 actuates the operation lever 83 in a direction indicated by an arrow 83a, and moves the control lever 62 via the coupling rod 84 in a direction indicated by an arrow 62a to assist the shifting operation. When the electric motor 81 (M1) is driven reverse, on the other hand, the shift-assisting device 8 actuates the operation lever 83 in a direction indicated by an arrow 83b, and moves the control lever 62 via the coupling rod 84 in a direction indicated by an arrow 62b to assist the shifting operation.

The shift-assisting device 8 in the illustrated embodiment is provided with a shift stroke sensor 85 (SIS) for detecting the shift stroke position of the shift mechanism. The shift stroke sensor 85 (SIS) is connected to the control lever 62 via a rod 86 and a lever 87, is constituted by a potentiometer that detects the shift stroke position according to the angle of operation of the control lever 62, and sends a detection signal to the controller 10.

The controller 10 is constituted by a microcomputer which comprises a central processing unit (CPU) 101 for executing the operation according to a control program, a read-only memory (ROM) 102 for storing the control program and a multiplying factor corresponding to a shift stroke position that will be described later, a read/write random access memory (RAM) 103 for storing the results of operation, a timer (T) 104, an input interface 105 and an output interface 106. The input interface 105 of the thus constituted controller 10 receives signals detected by the shifting force sensor 4 (SFS), by the selected position sensor 75 (SES) and by the shift stroke sensor 85 (SIS). The input interface 105 further receives a signal detected by a clutch pedal switch 91 (SW1) which detects the state of operation of a clutch pedal 9 for operating the clutch disposed between the engine that is not shown and the transmission 2. The clutch pedal switch 91 (SW1) is turned off in a state where the clutch pedal 9 is released, i.e., where the clutch pedal 9 is not depressed (clutch is connected), and produces a signal ON when the clutch pedal 9 is depressed to disconnect the clutch. When an automatic clutch is mounted to automatically disconnect or connect the clutch based on the signals from the shift knob switch 4 and from the shift stroke sensor 85 (SIS), the input interface 105 receives a signal detected by a clutch stroke sensor that detects the amount of engagement of the clutch instead of the clutch pedal 9. The output interface 106 sends control signals to the electric motor 81 (M1) and the like.

Figure 7:
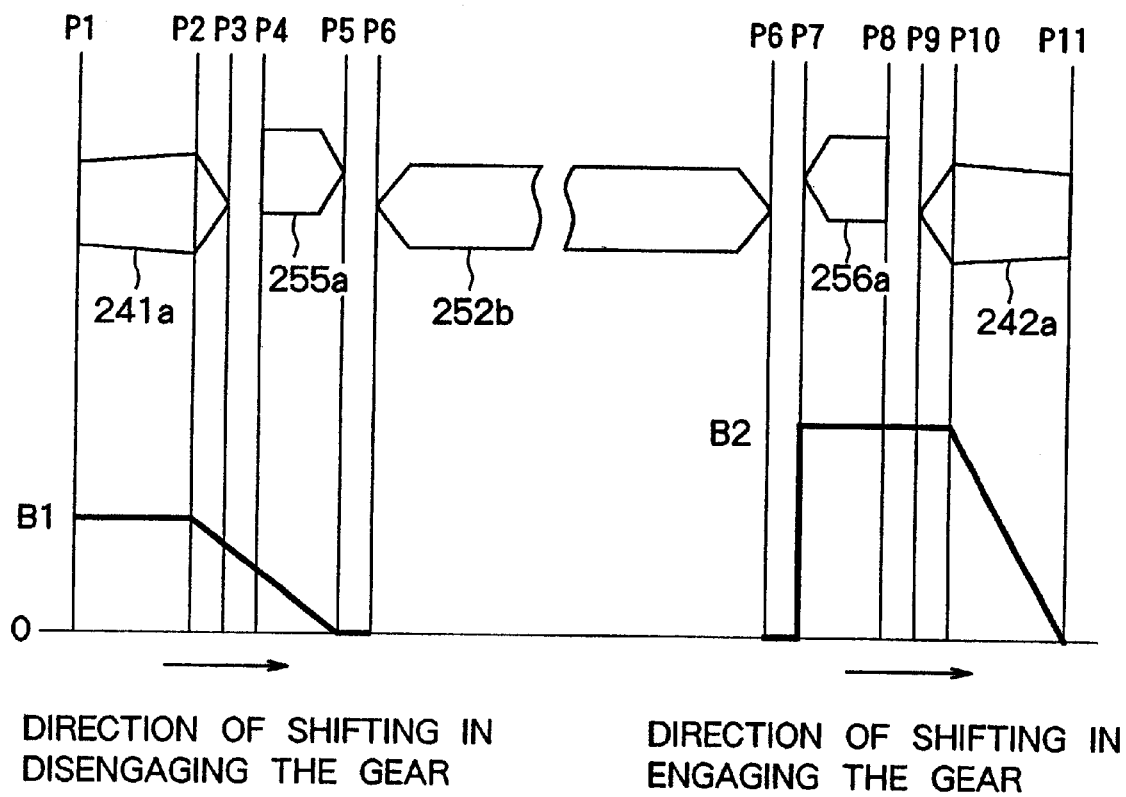
FIG. 7 is a diagram illustrating a relationship between the shift stroke positions of a clutch sleeve in the synchronizing mechanism shown in FIG. 2 and the multiplying factors of voltages applied to an electric motor in the shift-assisting device.

Next, the assisting force corresponding to the shift stroke position will be described with reference to FIG. 7. FIG. 7 illustrates a positional relationship among the spline 252b of the clutch sleeve 252, teeth 255a of the synchronizer ring 255 for the fifth speed gear 241 and dog teeth 241a, teeth 256a of the synchronizer ring 256 for the fourth speed gear 242 and dog teeth 242a in their neutral state. In the embodiment shown in FIG. 7, a shift stroke position of the clutch sleeve 252 in its neutral state is designated at P6. P5 denotes a shift stroke position of the clutch sleeve 252 that is moved from the neutral state toward the fifth speed gear 241 (toward the left in FIG. 7) and arrives at a front end of the chamfer of the teeth 255a of the synchronizer ring 255 for the fifth speed gear 241, P4 denotes a shift stroke position of the clutch sleeve 252 that arrives at a rear end of the teeth 255a of the synchronizer ring 255, P3 denotes a shift stroke position of the clutch sleeve 252 that arrives at the front end of the chamfer of the dog teeth 241a for the fifth speed gear 241, P2 denotes a shift stroke position (shift stroke position where meshing with the dog teeth 241a of the clutch sleeve 252 is discontinued in the gear-disengaging operation) of the clutch sleeve 252 that arrives at the rear end of the chamfer of the dog teeth 241a, and P1 denotes a shift stroke position of the clutch sleeve 252 that arrives at the rear end of the dog teeth 241a.

Further, P7 denotes a shift stroke position of the clutch sleeve 252 that is moved from the neutral state toward the fourth speed gear 242 (toward the right in FIG. 7) and arrives at the front end of the chamfer of the teeth 256a of the synchronizer ring 256 for the fourth speed gear 242, P8 denotes a shift stroke position of the clutch sleeve 252 that arrives at the rear end of the teeth 256a of the synchronizer ring 256, P9 denotes a shift stroke position of the clutch sleeve 252 that arrives at the front end of the chamfer of the dog teeth 242a for the fourth speed gear 242, P10 denotes a shift stroke position (shift stroke position where the meshing with the dog teeth 242a of the clutch sleeve 252 is discontinued in the gear-disengaging operation) of the clutch sleeve 252 that arrives at the rear end of the chamfer of the dog teeth 242a, and P11 denotes a shift stroke position of the clutch sleeve 252 that arrives at the rear end of the dog teeth 242a. The shift stroke positions are detected by the shift stroke sensor 85 (SIS). In the illustrated embodiment, the shift stroke sensor 85 (SIS) is so constituted as to produce a voltage signal of the smallest value when the shift stroke position is P1, to produce the output voltage that gradually increases as the shift stroke position goes toward the P11 side, and produces a voltage signal of the greatest value when the shift stroke position is P11.

In shifting the clutch sleeve 252 from the neutral state shown in FIG. 7 toward either the fourth speed gear 242 side or the fifth speed gear 241 side (in engaging the gears), the greatest operation force acts on the speed-change lever 3 in the synchronizing range of from the shift stroke positions P7 or P5, i.e., from the positions at which the synchronizing action starts up to the shift stroke position P8 or P4 at which the synchronizing action ends. In the gear-engaging operation, therefore, the electric motor 81 (M1) may be driven in at least the synchronizing range to assist the shifting operation. In the gear-engaging operation, further, a relatively large force, though it is smaller than that in the above-mentioned synchronizing range, acts on the speed-change lever 3 in the engaging range of from the shift stroke position P9 or P3 to the shift stroke position P10 or P2, i.e., in a range where the chamfer of the spline 252b of the clutch sleeve 252 engages with the chamfer of the dog teeth 242a or 241a. In the gear-engaging operation, therefore, it is desired to assist the shifting operation by driving the electric motor 81 (M1) even during the period in which the dog teeth engage with the chamfer of the clutch sleeve. When the clutch sleeve 252 returns to the neutral state from a state of being engaged with the fourth speed gear 242 or the fifth speed gear 241, i.e., from the shift stroke position P11 or P1, further, a relatively large force acts on the speed-change lever 3 during a period until the spline 252b of the clutch sleeve 252 passes through the shift stroke position P10 or P2, i.e., passes through the rear end of the chamfer of the dog teeth. At the time of this gear-disengaging operation, therefore, the shifting operation may be assisted by driving the electric motor 81 (M1) during the shift stroke of from the gear-engaged state until the rear end of the chamfer of the dog teeth is passed (i.e., in the range at which the dog teeth are in mesh with the clutch sleeve 252).

The assisting force in the gear-disengaging operation may be smaller than the assisting force in the gear-engaging operation. The assisting force is controlled by controlling the electric power (voltage or current) applied to the electric motor 81 (M1). The rotational direction in which the electric motor 81 (M1) is driven is, for example, the forward rotation when the clutch sleeve 252 is actuated toward the left in FIG. 7 (i.e., when the output voltage (Vf) of the above shifting force sensor 4 (SFS) is smaller than 2.5 V) and is, for example, the reverse rotation when the clutch sleeve 252 is actuated toward the right in FIG. 7 (i.e., when the output voltage (Vf) of the shifting force sensor 4 (SFS) is larger than 2.5 V). When, for example, the state where the gear is engaged with the fifth speed gear 241 is to be shifted down to the fourth gear position, the electric motor 81 (M1) is reversely driven with a voltage Va corresponding to the output voltage (Vf) of the shifting force sensor 4 (SFS) multiplied by a multiplying factor (B) of B1 during from P1 up to P2, i.e., until the spline 252b of the clutch sleeve 252 passes over the rear end of the chamfer of the dog teeth 241a (during a period in which the dog teeth are in mesh with the clutch sleeve 252) as shown in FIG. 7. Then, the multiplying factor (B) is gradually lowered from B1 to P5 so as to be brought to zero (0) at P5.

When the clutch sleeve 252 arrives at P7 at which the synchronizing action starts from the neutral position P6, the electric motor 81 (M1) is reversely driven with a voltage (Va) corresponding to the output voltage (Vf) of the shifting force sensor 4 (SFS) multiplied by a multiplying factor (B) of B2 which is larger than the above B1. In the embodiment shown in FIG. 7, the reverse rotation is maintained with the multiplying factor (B) of B2 for a period until the spline 252b of the clutch sleeve 252 passes P10 that corresponds to the rear end of the chamfer of the dog teeth 242a. As the clutch sleeve 252 passes over the above P10, the multiplying factor (B) is gradually lowered over a period of from P10 to P11 and is brought to zero (0) at P11.

As described above, in this embodiment, the voltage (Va) applied for driving the electric motor 81 (M1), i.e., the voltage (Va) corresponding to the output voltage (Vf) of the shifting force sensor 4 (SFS) multiplied by a multiplying factor (B) set correspondingly to the shift stroke position (P), is obtained by multiplying the multiplying factor (B), the output voltage (Vf) of the shifting force sensor 4 (SFS) and the constant (C) (Va=B×Vf×C). The constant (C) can be included in the multiplying factor (B). Upon providing the constant (C), however, general applicability can be imparted to meet various kinds of devices.

According to the illustrated shift-assisting device of the embodiment as described above, the assisting force is controlled correspondingly to the shift stroke position and is, further, controlled correspondingly to the shifting force of the speed-change lever. Therefore, no time lag occurs in driving the electric motor, and the force for operating the speed-change lever can be uniformalized over the full stroke in the shifting operation, making it possible to produce the assisting force close to the driver's operation feeling that meets the shifting force.

Figure 8:
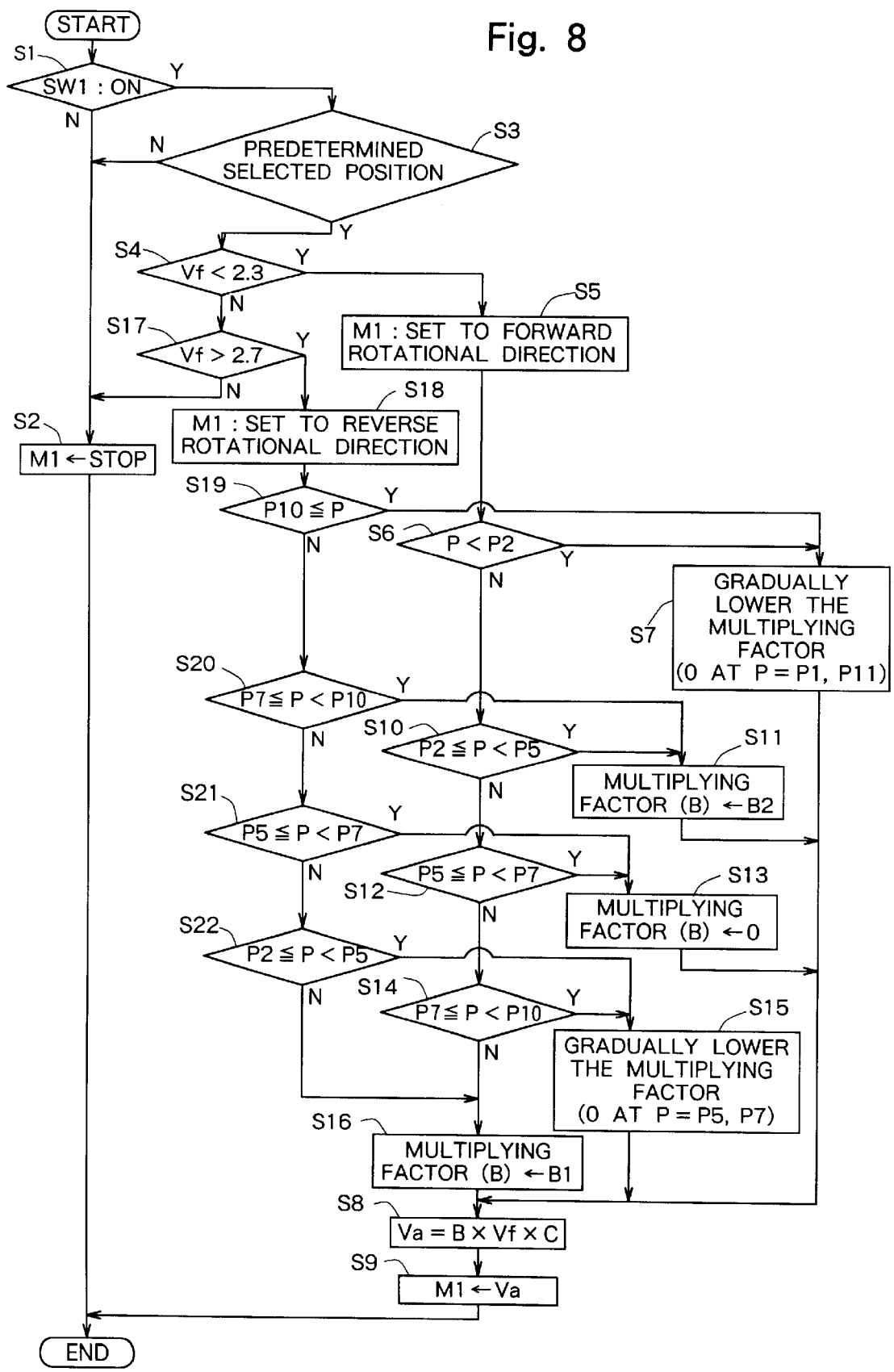
FIG. 8 is a flowchart illustrating a procedure of shift-assisting control operation of a controller that constitutes the shift-assisting device for the transmission according to the present invention.

Next, the operation of the controller 10 for assisting the shifting operation in the speed-change operation will be described with reference to a flow chart shown in FIG. 8.

First, the controller 10 checks at step S1 in the main routine shown in FIG. 7 whether the clutch pedal switch 91 (SW1) is turned on, i.e., whether the clutch pedal 9 is depressed to disconnect the clutch. When the automatic clutch is mounted, it is checked whether the amount of engagement of the clutch is rather on the disconnected side than the partly-connected state of the clutch based on a signal from the clutch stroke sensor that detects the amount of engagement of the clutch. When the clutch pedal switch 91 (SW3) has not been turned on at step S1, the controller 10 judges that the driver is not willing to change the speed since the clutch has not been disconnected, and the routine proceeds to step S2 to end the operation by bringing the electric motor 81 (M1) into a halt.

When the clutch pedal switch 91 (SW1) has been turned on at step S1, the controller 10 judges that the clutch has been disconnected and the driver is willing to change the speed, and the routine proceeds to step S3 where it is checked whether the position of the shift lever 64 in the direction of selection detected by the selected position sensor 75 (SES) is at a predetermined selected position. That is, it is checked whether the shift lever 64 is at a position to engage with only any one of the shift blocks 661, 662 and 663 mounted on the shift rods 651, 652 and 653. When the shift lever 64 has not been brought to the predetermined selected position at step S3, the controller 10 judges that the shift lever 64 may engage with two shift blocks when the electric motor 81 (M1) is driven in this state, and the routine proceeds to step S2 to end the operation by bringing the electric motor 81 (M1) into a halt. If the electric motor 81 (M1) is driven in a state where the shift lever 64 has not been brought to the predetermined selected position, the shift lever 64 engages with the two shift blocks to actuate the two shift rods simultaneously. Therefore, the interlocking mechanism works to limit the operation of the shift rods, and the electric motor 81 (M1) that is being driven may seize. In the illustrated embodiment, however, when the shift lever 64 has not been brought to the predetermined selected position as described above, the routine proceeds to step S2 to bring the electric motor 81 (M1) into a halt, whereby the electric motor 81 (M1) can be beforehand prevented from seizing.

Figure 4:
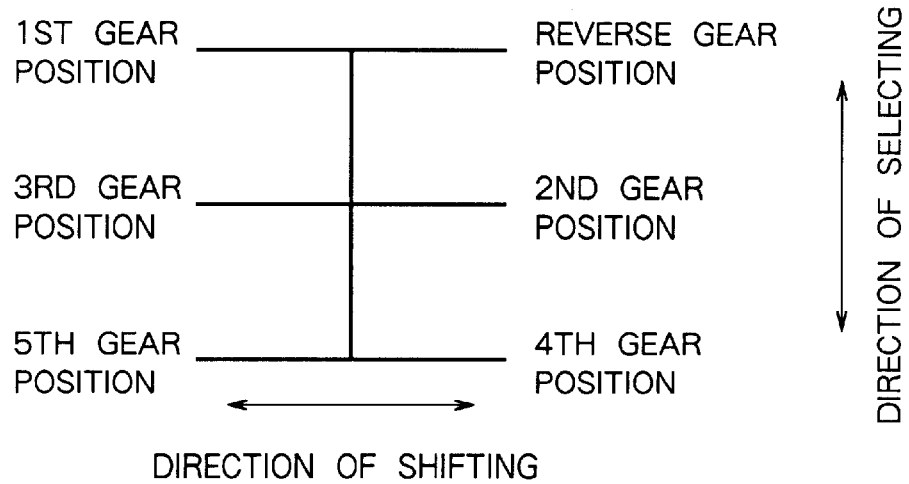
FIG. 4 is a diagram illustrating a shifting pattern of a speed-change lever in the speed-changing mechanism shown in FIG. 1.
Figure 5:
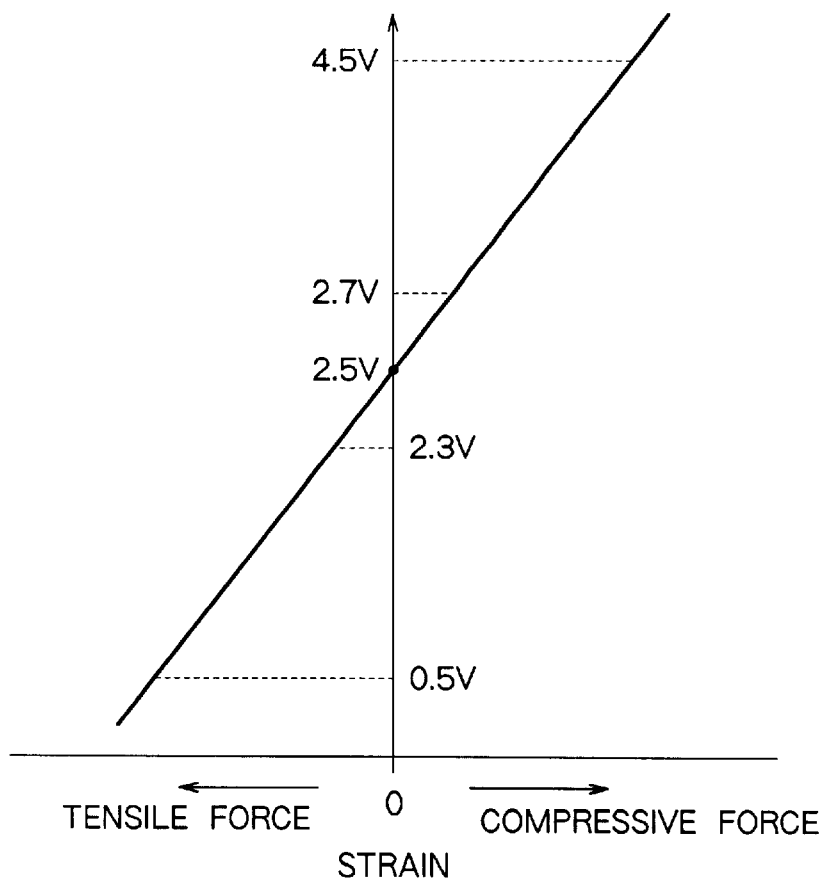
FIG. 5 is a diagram illustrating the output characteristics of a shifting force sensor that detects the shifting force of the speed-change lever in the speed-changing mechanism shown in FIG. 1.

When the position of the shift lever 64 in the direction of selection detected by the selected position sensor 75 (SES) has been brought to the predetermined selected position at step S3, the controller 10 proceeds to step S4 where it is checked whether the output voltage (Vf) of the shifting force sensor 4 (SFS) is lower than 2.3 V, i.e., whether the speed-change lever 3 is operated toward the left (the first gear position, third position or fifth position side) in FIG. 4. Here, the output voltage (Vf) of the shifting force sensor 4 (SFS) is set to be 2.3 V which is lower than 2.5 V from the stand-point of providing an insensitive zone by taking dispersion of the sensor into consideration. When the output voltage (Vf) of the shifting force sensor 4 (SFS) is lower than 2.3 V at step S4, the controller 10 judges that the speed-change lever 3 has started the operation to change the speed toward the first gear position, third gear position or fifth gear position, and the routine proceeds to step S5 to set the electric motor 81 (M1) to turn forward. The routine then proceeds to step S6 where it is checked whether the shift stroke position P detected by the shift stroke sensor 85 (SIS) is smaller than P2, i.e., whether the clutch sleeve 252 is rather closer to the gear-engaging side than the rear end of the chamfer of the dog teeth 241a. When the shift stroke position P is smaller than P2 at step S6, the controller 10 judges that the clutch sleeve 252 is rather on the gear-engaging side than the rear end of the chamber of the dog teeth 241a and the shift-assisting force should be lowered. The routine then proceeds to step S7 where the multiplying factor (B) for operating the voltage applied to the electric motor 81 (M1) is gradually lowered and is brought to zero (0) after the shift stroke position P has reached P1. In the step of gradually lowering the multiplying factor (B), the controller 10 proceeds to step S8 to operate the voltage (Va) (Va=B×Vf×C) to be applied to the electric motor 81 (M1). The controller 10 then proceeds to step S9 to drive the electric motor 81 (M1) with the voltage (Va) operated at step S8.

When the shift stroke position P is larger than P2 at step S6, the controller 10 proceeds to step S10 to check whether the shift stroke position P is larger than P2 but is smaller than P5, i.e., whether the clutch sleeve 252 is in a range of from a position of starting the synchronization up to a position where it engages with the chamfer of the dog teeth. When the shift stroke position P is larger than P2 but is smaller than P5 at step S10, the controller 10 judges that the clutch sleeve 252 is in the range of from the position of starting the synchronization up to the position where it engages with the chamfer of the dog teeth, and that the shifting must be assisted in the gear-engaging operation. The routine therefore proceeds to step S11 to set the multiplying factor (B) to B2 to operate the voltage (Va) that is to be applied to the electric motor 81 (M1). After the multiplying factor (B) is set to B2 at step S11, the controller 10 proceeds to step S8 to operate the voltage (Va) to be applied to the electric motor 81 (M1) (Va=B2×Vf×C). The controller 10 then proceeds to step S9 to drive the electric motor 81 (M1) with the voltage (Va) operated at step S8.

When the shift stroke position P is not lager than P2 or is not smaller than P5 at step S10, the controller 10 proceeds to step S12 to check whether the shift stroke position P is larger than P5 but is smaller than P7, i.e., whether the clutch sleeve 252 is positioned between the two synchronizer rings 255 and 256. When the shift stroke position P is larger than P5 but is smaller than P7 at step S12, the controller 10 judges that the clutch sleeve 252 is positioned between the two synchronizer rings 255 and 256 and there is no need to assist the shifting operation. The routine, then, proceeds to step S13 where the multiplying factor (B) for operating the voltage (Va) that is to be applied to the electric motor 81 (M1) is set to zero (0). The controller 10 then proceeds to step S8 to operate the voltage (Va) (Va=B×Vf×C) to be applied to the electric motor 81 (M1). This time, the multiplying factor (B) is zero (0) and, hence, the voltage (Va) to be applied to the electric motor 81 (M1) becomes zero (0). As a result, the controller 10 proceeds to step S9 to discontinue the driving of the electric motor 81 (M1).

When the shift stroke position is not larger than P5 or is not smaller than P7 at step S12, the controller 10 proceeds to step S14 to check whether the shift stroke position is larger than P7 but is smaller than P10, i.e., whether the clutch sleeve 252 is disengaged from the dog teeth 242a and the gear has been completely disengaged. When the shift stroke position is larger than P7 but is smaller than P10 at step S14, the controller 10 judges that the clutch sleeve 252 has been completely disengaged from the dog teeth 242a, and the routine proceeds to step S15 where the multiplying factor (B) for operating the voltage (Va) applied to the electric motor 81 (M1) is gradually lowered and is brought to zero (0) after the shift stroke position P has reached P7. In the step of gradually lowering the multiplying factor (B), the controller 10 proceeds to step S8 to operate the voltage (Va) (Va=B×Vf×C) that is to be applied to the electric motor 81 (M1). The controller 10 then proceeds to step S9 to drive the electric motor 81 (M1) with the voltage (Va) operated at step S8.

When the shift stroke position P is not larger than P7 or is not smaller than P10 at step S14, the controller 10 judges that the clutch sleeve 252 is in mesh with the dog teeth 242a and the shifting must be assisted at the time of gear-disengaging operation. The routine, then, proceeds to step S16 to set the multiplying factor (B) to B1 to operate the voltage (Va) that is to be applied to the electric motor 81 (M1). After the multiplying factor (B) is set to B1 at step S16, the controller 10 proceeds to step S8 to operate the voltage (Va) (Va=B1×Vf×C) to be applied to the electric motor 81 (M1). The controller 10, then, proceeds to step S9 to drive the electric motor 81 (M1) with the voltage (Va) operated at step S8.

Next, described below is a case where the output voltage (Vf) of the shifting force sensor 4 (SFS) is not lower than 2.3 V at step S4.

When the output voltage (Vf) of the shifting force sensor 4 (SFS) is not lower than 2.3 V at step S4, the controller 10 proceeds to step S17 to check whether the output voltage (Vf) of the shifting force sensor 4 (SFS) is higher than 2.7 V, i.e., whether the speed-change lever 3 has started to move toward the right in FIG. 4 (the second position, fourth position or reverse position side). Here, the output voltage (Vf) of the shifting force sensor 4 (SFS) is set to be 2.7 V which is higher than 2.5 V in order to provide an insensitive zone by taking the dispersion of the sensor into consideration. When the output voltage (Vf) of the shifting force sensor 4 (SFS) is not higher than 2.7 V at step S17, the controller 10 judges that the driver is not willing to change the speed, and the routine proceeds to step S2 to end the operation by bringing the electric motor 81 (M1) into a halt.

When the output voltage (Vf) of the shifting force sensor 4 (SFS) is higher than 2.7 V at step S17, the controller 10 proceeds to step S18 to set the electric motor 81 (M1) to rotate reverse. The routine, then, proceeds to step S19 to check whether the shift stroke position P detected by the shift stroke sensor 85 (SS) is larger than P10, i.e., whether the clutch sleeve 252 is rather on the gear-engaging side than the rear end of the chamfer of the dog teeth 242a. When the shift stroke position P is larger than P10 at step S19, the controller 10 judges that the clutch sleeve 252 is rather on the gear-engaging side than the rear end of the chamfer of the dog teeth 242a and that the assisting force should be decreased. The routine, then, proceeds to step S7 where the multiplying factor (B) for operating the voltage (Va) to be applied to the electric motor 81 (M1) is gradually decreased and is brought to zero (0) after the shift stroke position P has reached P1. In the step of gradually decreasing the multiplying factor (B), the controller 10 proceeds to step S8 to operate the voltage (Va) (Va=B×Vf×C) to be applied to the electric motor 81 (M1). The controller 10, then, proceeds to step S9 to drive the electric motor 81 (M1) with the voltage (Va) operated at step S8.

When the shift stroke position P is smaller than P10 at step S19, the controller 10 proceeds to step S20 to check whether the shift stroke position P is larger than P7 but is smaller than P10, i.e., whether the clutch sleeve 252 lies in a range of from a position of starting the synchronization up to a position where it engages with the chamfer of the dog teeth. When the shift stroke position P is larger than P7 but is smaller than P10 at step S20, the controller 10 judges that the clutch sleeve 252 is in the range of from a position of starting the synchronization up to a position where it engages with the chamfer of the dog teeth and that the shifting must be assisted at the time of gear-engaging operation. The routine proceeds to step S11 where the multiplying factor (B) for operating the voltage (Va) to be applied to the electric motor 81 (M1) is set to be B2. The controller 10, then, proceeds to step S8 to operate the voltage (Va) (Va=B2×Vf×C) to be applied to the electric motor 81 (M1), and the routine proceeds to step S9 to drive the electric motor 81 (M1) with the voltage (Va) operated at step S8.

When the shift stroke position P is not larger than P7 or is not smaller than P10 at step S20, the controller 10 proceeds to step S21 to check whether the shift stroke position P is larger than P5 but is smaller than P7, i.e., whether the clutch sleeve 252 is positioned between the two synchronizer rings 255 and 256. When the shift stroke position is larger than P5 but is smaller than P7 at step S21, the controller 10 judges that the clutch sleeve 252 is positioned between the two synchronizer rings 255 and 256 and that there is no need to assist the shifting operation. The routine, then, proceeds to step S13 where the multiplying factor (B) for operating the voltage (Va) to be applied to the electric motor 81 (M1) is set to zero (0). The controller 10, then, proceeds to step S8 to operate the voltage (Va) (Va= B×Vf×C) to be applied to the electric motor 81 (M1). This time, the multiplying factor (B) is zero (0), and the voltage (Va) applied to the electric motor 81 (M1) becomes zero (0). As a result, the controller 10 proceeds to step S9 to discontinue the driving of the electric motor 81 (M1).

When the shift stroke position P is not larger than P5 or is not smaller than P7 at step S21, the controller 10 proceeds to step S22 to check whether the shift stroke position is larger than P2 but is smaller than P5, i.e., whether the clutch sleeve 252 is disengaged from the dog teeth 241a and the gear is completely disengaged. When the shift stroke position P is larger than P2 but is smaller than P5 at step S22, the controller 10 judges that the clutch sleeve 252 is disengaged from the dog teeth 241a and the gear is completely disengaged, and the routine proceeds to step S15 where the multiplying factor (B) for operating the voltage (Va) to be applied to the electric motor 81 (M1) is gradually decreased and is brought to zero (0) after the shift stroke position P has reached P7. In the step of gradually decreasing the multiplying factor (B), the controller proceeds to step S8 to operate the voltage (Va) (Va=B×Vf×C) to be applied to the electric motor 81 (M1). The controller 10 then proceeds to step S9 to drive the electric motor 81 (M1) with the voltage (Va) operated at step S8.

When the shift stroke position P is not larger than P2 or is not smaller than P5 at step S22, the controller 10 judges that the clutch sleeve 252 and the dog teeth 241a are in mesh together and that the shifting must be assisted in the gear-disengaging operation. The routine, then, proceeds to step S16 where the multiplying factor (B) for operating the voltage (Va) to be applied to the electric motor 81 (M1) is set to B1. The controller 10, then, proceeds to step S8 to operate the voltage (Va) (Va=B1×Vf×C) to be applied to the electric motor 81 (M1), and the routine proceeds to step S9 to drive the electric motor 81 (M1) with the voltage (Va) operated at step S8.

Though the present invention was described above by way of the illustrated embodiment, it should be noted that the invention is in no way limited thereto only. For example, according to the illustrated embodiment, the voltage (Va) for driving the electric motor 81 (M1) is obtained by multiplying the multiplying factor (B) set correspondingly to the shift stroke position (P), the output voltage (Vf) of the shifting force sensor 4 (SFS) and the constant (C) (Va=B× Vf×C). However, it is also allowable to obtain the voltage (Va) by adding up a reference voltage set correspondingly to the shift stroke position (P) and a correction output voltage (Vf) of the shifting force sensor 4 (SFS). That is, a reference voltage in the shift stroke between P1 and P2 and in the shift stroke between P11 and P10 in the gear-disengaging operation is denoted by, for example, V1, a reference voltage in the shift stroke between P5 and P2, and in the shift stroke between P7 and P10 in the gear-engaging operation is set to be, for example, V2 which is higher than the above V1. The reference voltage (V1, V2) and the correction voltage (Ve) corresponding to the output voltage (Vf) of the shifting force sensor 4 (SFS) are added up to obtain a voltage (Va) to be applied for driving the electric motor 81 (M1). The correction voltage (Ve) can be obtained by multiplying the output voltage (Vf) of the shifting force sensor 4 (SFS) by the constant (C) (Ve=Vf×C).

Being constituted as described above, the shift-assisting device for a transmission of the invention exhibits actions and effects as described below.

That is, according to the present invention, the electric power for driving the shift-assisting electric motor is determined based on the shift stroke position and the shifting force, enabling the assisting force to be controlled correspondingly to the shift stroke position and, besides, enabling the assisting force to be controlled correspondingly to the shifting force of the speed-change lever. Accordingly, no time lag occurs in driving the electric motor, the force for operating the speed-change lever is uniformalized over the whole stroke of shifting operation, and the assisting force close to the driver's operation feeling can be obtained to meet the shifting force.

What I claim is:

1. A shift-assisting device for a transmission equipped with a synchronizing mechanism and with an electric motor for operating a shifting mechanism in the same direction as the direction of shifting operation of a speed-change lever for the transmission, the shifting mechanism being coupled to the speed-change lever to actuate the synchronizing mechanism of the transmission, said shift-assisting device comprising:

a shift stroke sensor for detecting the shift stroke position of the shifting mechanism;

a shifting force sensor for detecting the amount of shifting force of the speed-change lever; and a controller responsive to the shift stroke position detected by said shift stroke sensor and the amount of shifting force detected by said shifting force sensor, for controlling the electric power applied to drive the electric motor.

2. A shift-assisting device for a transmission according to claim 1, wherein said controller controls the electric power to drive the electric motor based on a multiplying factor set correspondingly to the shift stroke position, multiplied by the detected shifting force and a predetermined constant.

* * * * *